UNITED STATES PATENT OFFICE 2,535,057

PROCESS FOR MAKING ULTRAMARINE

Albert E. Gessler, Scarsdale, and Charles A. Kumins, Brooklyn, N. Y., assignors to Interchemical Corporation, New York, N. Y., a corporation of Ohio No Drawing. Application October 8, 1947, Serial No. 778,728

12 Claims. (Cl. 106—305)

This invention relates to ultramarine blue and aims to provide a new and economical method for its production.

Ultramarine blue is a sulfur containing sodium aluminum silicate having a crystal structure closely resembling that of the zeolites. The blue color is attributed to the presence of sulfur complexes in the crystal lattice. It is widely used as a blue pigment in paints, inks, paper, etc.

Ultramarine blue is produced commercially by calcining, under various conditions and in various types of apparatus, an intimate mixture of china clay with about an equal weight of sodium carbonate and/or sodium sulfate and sulfur, and with a small amount of carbonaceous material such as pitch, rosin or charcoal. A small amount of silica is also sometimes included in the mixture. The ingredients and proportions are often varied in order to obtain products having different properties. For example, when sodium sulfate with no sodium carbonate is used, a weak, greenish product which is low in hiding power and poor in acid resistance is obtained, and when sodium carbonate with no sodium sulfate is used, together with some silica and a high percentage of sulfur, a dark, reddish blue product with improved hiding power and acid resistance is obtained.

In one method the mixture is calcined, with exclusion of air, in covered, cylindrical or tapered fireclay or other refractory crucibles placed one upon another in a muffle or shaft furnace, for from 7 to 10 hours, at a temperature "between red and white heat." This operation produces green ultramarine. The exact time and temperature of the calcination depend upon the ingredients and the proportions of ingredients, the size and shape of the crucibles, the dimensions of the furnace, etc. At the end of the calcination the furnace is allowed to cool, which process generally takes from 2 to 3 days. The crucibles are then removed and the fused ultramarine green is crushed and dry-milled in revolving barrels, ball mills, cone mills or pulverizers, etc. and screened to remove coarse particles. The ultramarine green is then intimately mixed with from about 7% to 10% of finely ground sulfur and roasted at "a medium red to a bright red heat" in a muffle, retort, cylindrical or other type furnace. The sulfur, instead of being preliminarily mixed with the ultramarine green, may be added intermittently during the roasting operation. It melts and burns as air is admitted, sulfur dioxide is formed and escapes and the green color gradually changes to blue. The roasting operation takes 2 or 3 days, or longer. The roasted blue product is finally lixiviated to remove soluble salts, wet-milled, dried and dry-milled.

In another method, often called the direct process, the mixture is calcined, with some admission of air, either in covered crucibles or pots, placed one upon another in a muffle furnace, or simply spread upon the floor of the muffle. When operating according to this method the furnace is slowly heated to about 800° C. and maintained at this temperature until a withdrawn test sample indicates that the operation is finished. The furnace is then closed and allowed to cool. The heating period usually extends over from 24 to 36 hours and the cooling period usually extends over from 6 to 8 days.

These methods have certain inherent disadvantages. They are very time-consuming, often requiring from 10 to 14 days, or longer, to obtain the finished product, and they are difficult to control. They result in the formation of hard, fused masses. In both methods the process includes the formation of a zeolite by fusing china clay with sodium carbonate and/or sodium sulfate, the simultaneous formation of sodium polysulfide by reaction of sulfur and sodium carbonate and/or sodium sulfate under reducing conditions, and the simultaneous reaction of the zeolite with polysulfide. At this high temperature of formation of zeolite the structure is compacted and less susceptible to the entrance of the rather large polysulfide linkage into the crystal lattice. The polysulfide formation reaction is an equilibrium one and excess sulfur is required for the formation of the desirable higher polysulfides, $Na_2S_3, Na_2S_4$ etc. Under the high temperature conditions of the operation required for the reduction of sodium carbonate and/or sodium sulfate, these higher content polysulfides may not form, due to the loss of sulfur by volatilization. It is believed that the intensity of blue color and tinting strength of the pigment depend at least in part upon the amount of sulfur carried into the crystal lattice by the sodium and that therefore the formation of higher polysulfides is extremely important.

Thus in the known process three reactions take place simultaneously under conditions unfavorable to each one of them.

Our method comprises using favorable conditions for each of these reactions and in all cases avoids more than incipient fusion. In our method the zeolite is formed by an economical wet precipitation process which is subject to easy but definite control and then mixed with polysulfide of the desired sulfur content which is a readily obtainable article of commerce. Having the raw materials for the reaction thus formed, we are concerned only with the ultramarine formation.

Our new method comprises heating zeolite, preferably artificially prepared zeolite, preformed under carefully controlled conditions, for example, by reacting solutions of sodium silicate and sodium aluminate, with sodium polysulfide and sulfur, with exclusion of air, at a temperature above 600° C. preferably from 750° C. to 850° C. over a period of 2 to 4 hours, allowing to cool to about 475° C. to 625° C. and then oxidizing at this temperature by the slow admission of air and/or sulfur dioxide during a period of about 3 hours. The resultant product is then removed from the furnace, washed and ground. The overall processing time is reduced from about 10 to 14 days or longer, required in the known process, to about 2 days.

Artificial zeolites of the type we prefer to employ do not have an exact chemical formula. They generally correspond approximately to the formula $Al_2O_3 \cdot Na_2O \cdot 2SiO_2$. We prefer to use zeolite with a slightly higher ratio of silica, for example 2¼ to 2½ molecular equivalents of silica to about 1 each of alumina and soda. This corresponds to about 45 to 48% silica compared with 42.2% contained in that having 2 molecular equivalents. We have found, however, that we can employ a zeolite containing 54% silica or more.

It will be noted that a feature of our invention is that the temperature of oxidation is much lower than that of the known process. It is known that the conversion of ultramarine green to ultramarine blue is accompanied by the removal of sodium oxide as sodium sulfate. It is also known that sulfur dioxide is oxidized most efficiently at a temperature of about 400° C. to 500° C. Apparently it has not heretofore been known that ultramarine green is converted to ultramarine blue most efficiently and in a shorter time at the relatively low temperature which we use. It is our belief that the sodium sulfate is formed by the reaction of sulfur trioxide with that part of the sodium oxide which is held rather loosely on the surface of the crystal lattice, and that this sodium sulfate formation and accompanying oxidation to ultramarine blue take place most readily at the temperature most suitable for the oxidation of sulfur dioxide to sulfur trioxide under which conditions the sulfur trioxide concentration is highest.

We have furthermore discovered that the first reaction may be, and is preferably, carried out in the presence of hydrogen sulfide gas which enters into the reaction and thereby desirably increases the sulfur content of the finished product.

We have also discovered that the sodium polysulfide may be formed in situ from sodium sulfide and sulfur. This reaction is a much simpler one than the one including the simultaneous reduction of sodium carbonate and/or sodium sulfate and results in the formation of the higher sulfur content polysulfides without the presence of a large excess of sulfur. It is believed that some of the monosulfide may enter the zeolite crystal lattice and then carry more sulfur into the crystal lattice by reacting with excess sulfur to form polysulfide. When operating according to this procedure, artificial zeolite is mixed with sodium sulfide and elemental sulfur and the mixture is heated and treated throughout in the same manner as when zeolite is mixed with sodium polysulfide.

Our calcination process may be carried out in various ways and in various types of equipment. We may employ covered crucibles in muffle furnaces, we may spread the material on the floor of a muffle furnace, or we may use a batch rotary kiln or continuous type rotary kilns. If desired the greenish product may be quenched in water, washed and dried before the oxidation calcination, or it may be, and preferably is, oxidized without removing from the furnace.

Example 1 gives a method for preparing artificial zeolite. Examples 2, 3, 4, 5, 6 and 7 give methods for preparing ultramarine blue.

Example 1

A solution of 250 pounds of "N grade" sodium silicate, containing 72 pounds of silica ($SiO_2$), in 100 gallons of water at 60° C., is slowly added to a solution of 75 pounds of sodium aluminate ($Na_2Al_2O_4$) in 100 gallons of water, also at 60° C., while stirring continuously. The resulting zeolite is filtered, washed to remove sodium hydroxide and dried at 110° C.

Example 2

30 pounds of finely ground sodium polysulfide ($Na_2S_x$), 45 pounds of the zeolite of Example 1, and 45 pounds of finely ground elemental sulfur are mixed in a porcelain ball mill for about 5 hours and then charged into an externally heated rotating horizontal kiln. Air is flushed from the kiln with nitrogen and the temperature is gradually raised to about 850° C. and maintained at about 850° C. for 2 hours. During this time the nitrogen is gradually displaced with sulfur vapor, some of which escapes and is collected for re-use. The temperature is then allowed to drop to about 550° C. and is maintained at about 550° C., while slowly admitting air, for about 3 hours. The resulting blue pigment is discharged into water, washed by decantation until substantially free of water soluble salts, wet-milled in a porcelain ball mill, filtered, washed and dried.

Example 3

60 pounds of finely ground sodium monosulfide ($Na_2S9H_2O$), 45 pounds of the zeolite of Example 1 and 55 pounds of finely ground elemental sulfur are mixed in a porcelain ball mill for about 5 hours and then charged into an externally heated rotating horizontal kiln. The temperature is gradually raised to about 850° C. and maintained at about 850° C. for 2 hours. During this time sulfur vapor is evolved, escapes and is collected for re-use. The temperature is then allowed to drop to about 550° C. and is maintained at about 550° C., while slowly admitting air, for about 3 hours. The resulting blue pigment is discharged into water, washed by decantation until substantially free of water soluble salts, wet-milled in a porcelain ball mill, filtered, washed and dried.

Example 4

60 pounds of finely ground sodium monosulfide ($Na_2S9H_2O$), 45 pounds of the zeolite of Example 1, and 55 pounds of finely ground elemental sulfur are mixed in a porcelain ball mill for about 5 hours and then charged into an externally heated rotating horizontal kiln. The temperature is gradually raised to about 850° C. and maintained at about 850° C. for 2 hours. During this time sulfur vapor evolves, escapes and is collected for re-use. The temperature is then allowed to drop to about 550° C. and is maintained at about 550° C., while slowly admitting sulfur dioxide, for about 3 hours. The resulting blue pigment is discharged into water, washed by decantation until substantially free of water soluble salts, wet-milled in a porcelain ball mill, filtered, washed and dried.

*Example 5*

60 pounds of finely ground sodium monosulfide ($Na_2S9H_2O$), 45 pounds of zeolite of Example 1, and 55 pounds of finely ground elemental sulfur are mixed in a porcelain ball mill for about 5 hours and then charged into an externally heated rotating horizontal kiln. Air is flushed from the kiln with hydrogen sulfide and the temperature is gradually raised to about 850° C. and maintained at about 850° C. for 2 hours. During this time an atmosphere of hydrogen sulfide and sulfur vapors is maintained in the kiln. The temperature is then allowed to drop to about 550° C. and is maintained at about 550° C., while slowly admitting sulfur dioxide and air, for about 3 hours. The resulting blue pigment is discharged into water, washed by decantation until substantially free of water soluble salts, wet-milled in a porcelain pebble mill, filtered, washed and dried.

*Example 6*

30 pounds of finely ground sodium polysulfide ($Na_2S_x$), 45 pounds of zeolite of Example 1, and 45 pounds of finely ground elemental sulfur are mixed in a porcelain ball mill for about 5 hours and then charged into a covered clay crucible. The crucible is placed in a muffle furnace and heated to a temperature of about 850° C. and maintained at about 850° C. for 2 hours. The crucible is then removed and allowed to cool to room temperature, after which the contents are discharged into water and washed substantially free of water soluble salts. The resulting greenish product is dried, mixed with finely ground elemental sulfur equivalent to about 7 to 10% of its weight and the mixture is charged into another clay crucible and heated to about 500° C. in a muffle furnace, in the presence of air, for about 3 hours. The resulting blue pigment is discharged from the crucible into water, washed by decantation until substantially free of water soluble salts, wet-milled in a pebble mill, filtered and dried.

*Example 7*

45 pounds of the zeolite of Example 1, 60 pounds of finely ground sodium monosulfide ($Na_2S9H_2O$), and 55 pounds of finely ground elemental sulfur are mixed together in a porcelain pebble mill for about 3 hours and the mixture is charged into a covered clay crucible. The crucible and contents are placed in a muffle furnace, heated to a temperature of about 850° C. and maintained at 850° C., in the presence of hydrogen sulfide gas, for about 2 hours. The crucible is removed and allowed to cool to room temperature, after which the contents are discharged into water and washed substantially free of soluble salts. The resulting greenish product is dried and mixed with elemental sulfur equivalent to about 7 to 10% of its weight. The mixture is charged into another clay crucible and heated to a temperature of about 500° C. in a muffle furnace, in the presence of sulfur dioxide, and maintained at 500° C. for about 3 hours. The resulting blue pigment is discharged from the crucible into water, washed by decantation until substantially free of water soluble salts, wet-milled in a pebble mill, filtered and dried.

We have found that ultramarine made by our process is identical with commercial ultramarines chemically, as determined by X-ray diffraction analysis. In color our product is cleaner, brighter and has a somewhat more greenish undertone than that which is commonly sold.

We claim:

1. The method of obtaining an ultramarine blue which comprises heating an intimate mixture in proportions sufficient to produce an ultramarine blue, of artificial zeolite, a material selected from the group consisting of sodium sulfide and sodium polysulfides and an excess of sulfur under reducing conditions for 2 to 4 hours at 750° C. to 850° C., lowering the temperature of the mass to from 475° C. to 625° C., and maintaining it at such temperature in an oxidizing atmosphere and in the presence of oxides of sulfur for at least 1 hour, cooling the mass and washing.

2. The method of obtaining an ultramarine blue which comprises heating an intimate mixture in proportions sufficient to produce an ultramarine blue, of an artificial zeolite, containing at least 45% of silica on an anhydrous basis, a material selected from the group consisting of sodium sulfide and sodium polysulfides and an excess of sulfur under reducing conditions for at least 1½ hours at temperatures about 800° C., lowering the temperature of the mass to 500 to 600° C., and maintaining it at such temperature in an oxidizing atmosphere and in the presence of oxides of sulfur for at least 1 hour, cooling the mass and washing.

3. The method of obtaining an ultramarine blue which comprises heating an intimate mixture in proportions sufficient to produce an ultramarine blue, of artificial zeolite, a material selected from the group consisting of sodium sulfide and sodium polysulfides and an excess of sulfur under reducing conditions for 2 to 4 hours at about 800° C., lowering the temperature of the mass to about 550° C., and maintaining it at such temperature in an oxidizing atmosphere and in the presence of oxides of sulfur for 1 to 3 hours, cooling the mass and washing.

4. The method of obtaining an ultramarine blue which comprises heating an intimate mixture in proportions sufficient to produce an ultramarine blue, of artificial zeolite, containing from 45% to 48% silica on an anhydrous basis, a material selected from the group consisting of sodium sulfide and sodium polysulfides and an excess of sulfur in an atmosphere of hydrogen sulfide and sulfur vapor for 2 to 4 hours at about 850° C., lowering the temperature of the mass to about 550° C., and maintaining it at such temperature in an oxidizing atmosphere and in the presence of oxides of sulfur for at least 1 hour cooling the mass and washing.

5. The method of obtaining an ultramarine blue which comprises heating an intimate mixture in proportions sufficient to produce an ultramarine blue, of artificial zeolite containing above 45% silica on an anhydrous basis, a material selected from the group consisting of sodium sulfide and sodium polysulfides and an excess of sulfur under reducing conditions from 2 to 4 hours at a temperature of above 800° C., lowering the temperature of the mass to from 475° C. to 625° C., and maintaining it at such temperatures 6. The method of obtaining an ultramarine blue which comprises heating a mixture in proportions sufficient to produce an ultramarine blue, of artificial zeolite containing from 45% to 54% silica on an anhydrous basis, sodium sulfide equivalent to $Na_2S_4$ and an excess of sulfur under reducing conditions for 2 to 4 hours at 750° C. to 850° C., lowering the temperature of the mass to from 500° C. to 600° C., and maintaining it at such temperature in an oxidizing atmosphere and in the presence of oxides of sulfur for at least 1 hour, cooling the mass and washing.

7. The method of obtaining an ultramarine blue which comprises heating an intimate mixture in proportions sufficient to produce an ultramarine blue, of artificial zeolite, sodium sulfide equivalent of $Na_2S_4$ and an excess of sulfur under reducing conditions for at least 1½ hours at about 850° C., lowering the temperature of the mass to from 500° C. to 600° C., and maintaining it at such temperature in an oxidizing atmosphere and in the presence of oxides of sulfur for 3 hours, cooling the mass and washing.

8. The method of obtaining an ultramarine blue which comprises providing an intimate mixture in proportions sufficient to produce an ultramarine blue, of artificial zeolite containing 45% to 48% silica on an anhydrous basis, a sodium polysulfide and an excess of sulfur, raising the temperature of the mixture slowly to about 800° C., and maintaining such temperature and reducing conditions for 2 to 4 hours lowering the temperature of the mass to about 550° C., and maintaining it at such temperature in an oxidizing atmosphere and in the presence of oxides of sulfur for at least 1 hour, cooling the mass by quenching and washing.

9. The method of obtaining an ultramarine blue which comprises providing an intimate mixture in proportions sufficient to produce an ultramarine blue, of artificial zeolite, containing 45% to 54% silica on an anhydrous basis, a sodium polysulfide and an excess of sulfur, raising the temperature of the mixture slowly to about 800° C., and maintaining such temperature and reducing conditions for about 3 hours, lowering the temperature of the mass to about 500° C., and maintaining it at such temperature in an oxidizing atmosphere and in the presence of oxides of sulfur for about 3 hours, cooling the mass by quenching and washing.

10. The method of obtaining an ultramarine blue which comprises heating an intimate mixture in proportions sufficient to produce an ultramarine blue, of artificial zeolite, a material selected from the group consisting of sodium polysulfides and an excess of sulfur under reducing conditions for about 3 hours at a temperature in excess of 800° C., lowering the temperature of the mass to about 550° C., and maintaining it at such temperature in an oxidizing atmosphere and in the presence of oxides of sulfur from 1 to 3 hours, cooling the mass and washing.

11. The method of obtaining an ultramarine blue which comprises heating an intimate mixture in proportions sufficient to produce an ultramarine blue, of zeolite, a material selected from the group consisting of sodium sulfide and sodium polysulfides and an excess of sulfur under reducing conditions for at least 1½ hours at a temperature in excess of 800° C., lowering the temperature of the mass to from 475° C. to 625° C., and maintaining it at such temperature in an oxidizing atmosphere and in the presence of oxides of sulfur for at least 1 hour, cooling the mass and washing.

12. The method of obtaining an ultramarine blue which comprises heating an intimate mixture in proportions sufficient to produce an ultramarine blue, of zeolite, containing above 45% silica on an anhydrous basis, a material selected from the group consisting of sodium sulfide and sodium polysulfides and an excess of sulfur under reducing conditions for at least 1½ hours at 750° C. to 850° C., lowering the temperature of the mass to from 500° C. to 600° C., and maintaining it at such temperature in an oxidizing atmosphere and in the presence of oxides of sulfur for at least 1 hour, cooling the mass and washing.

ALBERT E. GESSLER.
CHARLES A. KUMINS.

No references cited.